United States Patent [19]
Billaud et al.

[11] Patent Number: 5,432,517
[45] Date of Patent: Jul. 11, 1995

[54] METHOD AND DEVICE FOR THE FILTERING OF RESPONSES IN A SECONDARY RADAR EXTRACTOR

[75] Inventors: Philippe Billaud, Fontenay Aux Roses; Didier Creveau, Antony; Claude De Volder, Auffargis; Lionel Largilliere, Sainte Genevieve des Bois, all of France

[73] Assignee: Thomson-CSF, Paris, France

[21] Appl. No.: 85,208

[22] Filed: Jun. 29, 1993

[30] Foreign Application Priority Data

Jun. 30, 1992 [FR] France .................. 92 08025

[51] Int. Cl.⁶ ................................ G01S 13/74
[52] U.S. Cl. .................. 342/40; 342/189; 342/159
[58] Field of Search .............. 342/40, 189, 37, 46, 342/159

[56] References Cited

U.S. PATENT DOCUMENTS

| | | | |
|---|---|---|---|
| 3,705,402 | 12/1972 | Ballantyne et al. | 342/40 |
| 3,887,916 | 6/1975 | Goyer | 342/30 |
| 3,913,100 | 10/1975 | Janex . | |
| 4,896,158 | 1/1990 | Cole, Jr. | 342/40 |
| 4,945,550 | 7/1990 | Krause et al. | 342/40 X |
| 5,001,751 | 3/1991 | Sanford et al. | 342/45 X |
| 5,126,744 | 6/1992 | Goedeke et al. | 342/40 |

FOREIGN PATENT DOCUMENTS 0184956  6/1986  European Pat. Off. .

*Primary Examiner*—John B. Sotomayor
*Attorney, Agent, or Firm*—Meltzer, Lippe Goldstein et al.

[57] ABSTRACT

A method for the defruiting of the responses from radar transponders received by a secondary radar in response to interrogations sent by the radar recurrently, a recurrence being formed by the interrogation and the responses received during a listening period that follows the interrogation, the defruiting operation consisting in verifying that a response received at an instant T of the recurrence is correlated by the presence of at least r−1 other responses received at the same instant T of their recurrence, these responses forming part of a sequence of at least r recurrences including the current recurrence, the method being one wherein the correlation is achieved over several chosen sequences and wherein the correlation is declared to be positive if it is positive for one of the sequences.

8 Claims, 9 Drawing Sheets

METHOD AND DEVICE FOR THE FILTERING OF RESPONSES IN A SECONDARY RADAR EXTRACTOR

BACKGROUND OF THE INVENTION

The present invention relates to the filtering of responses received by an extractor located downline with respect to a secondary radar receiver.

It is known that a radar can be fitted out with a device called a secondary radar that can be used to obtain, from cooperating carrier vehicles equipped with radar responders, coded information elements on the identity of the carrier and other coded information elements (altitude, reporting of radio malfunctions, distress signals etc).

The responders of the carrier vehicles can send out responses whenever they are interrogated and, sometimes, in one mode of operation known as the S mode, they can do so spontaneously. Each radar equipped with a secondary radar should therefore be provided with means enabling it to eliminate those responses, from among all the responses received, that are not responses to its own interrogations. The device that fulfils this function is a defruiter, the role of which is to get rid of the fruits, which is the name given to the responses that are made to other radar interrogators but are nevertheless received by all the radars.

In a known way, a defruiter comprises a synchronous filter which ascertains that the responses received during the listening periods that follow each of the interrogations are synchronous with the interrogations of the radar. The interrogation and the listening period that follows it constitute what shall hereinafter be called a recurrence. The radar making interrogations with a certain frequency of recurrence must receive responses that are time-lagged, the time lags of one antenna dwelling having the same value. The testing of the synchronism of the reponses may be such that each response is kept at its arrival during, for example, an interrogation period that may be extended to take account of the tolerance values proper to the responders and of the relative motions of the interrogator and of the responder, and is compared with the following interrogation. This comparison of the synchronism of two responses, the stored response and the following response, represents the simplest method, and the corresponding defruiter is called a "two out of two" defruiter. When the density of the fruits is high, it may happen that a fruit occurs, by chance, at the same period as an expected response and therefore constitutes, with the first response, a so-called "ghost" response that does not correspond to a real response.

Since this possibility has a non-negligible probability of occurrence, stricter criteria of acceptance have been created, corresponding to three out of three responses or four out of four responses. To consider that there is a synchronous response, the "three out of three responses" criterion requires that the following two succesive responses should correspond in time with the first response received. The requirement is of three successive synchronous responses in the case of the "four out of four" criterion.

If the interrogator radar were to receive a response for each of the interrogations sent, the use of such criteria would only reduce the probability of keeping a fruit and hence of forming a ghost response.

Figure 1A:
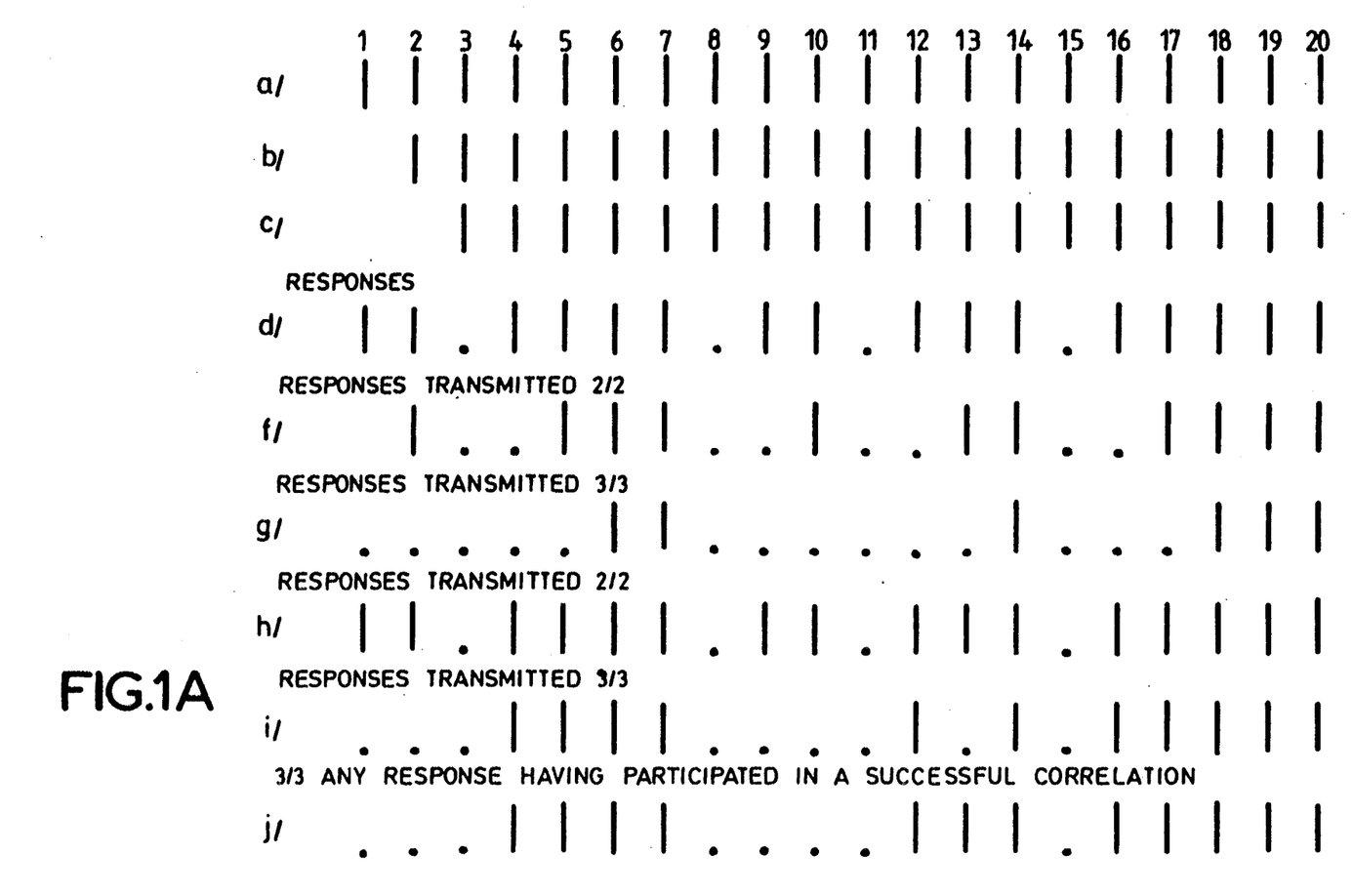
FIGS. 1a–1c is designed to explain the results obtained by the invention.

For various reasons, such as the deactivation of the responder to prevent an overload, or the masking of the antenna, certain responses are not received and consequently, the defruiter contributes to lowering the quality of the information. This deterioration of the information is shown in figure 1a.

This figure is formed by rows of vertical lines.

The first row "a" represents twenty vertical lines numbered 1 to 20, representing 20 successive interrogations of an interrogator in a given direction.

The next two rows b and c represent the number of responses obtained at output of a defruiter assuming that 100% of responses are received, i.e. one response for each interrogation.

The row b is obtained with a 2 out of 2 criterion. At output of the defruiter, there are therefore nineteen right responses since the defruiter gives a response only after at least two responses have been obtained. This type of defruiter, by construction, loses the first response.

The row c is obtained with a 3 out of 3 criterion and here there are only 18 right responses since it is necessary to wait for the third response for the defruiter to give a response. There is also a systematic loss of two responses.

In the row d, dots are used to represent gaps in the responses, assuming that only 80% of the interrogations give rise to a reception of a response. We have therefore shown four randomly distributed gaps by the elimination, in the row d, of the responses corresponding to the interrogations 3, 8, 11, 15.

The rows f and g represent reponses at output of a defruiter working with a 2/2 or 3/3 criterion. The defruiter working according to a 2/2 criterion gives no more than 11 right responses and the defruiter working according to the 3/3 criterion gives no more than 6 right responses. It must be noted that what has just been related with respect to examples is verified whatever the criterion of correlation adopted, when this criterion is of the type with at least r right responses on s recurrences. The number r of correlating responses, i.e. responses synchronous with interrogations, in the same distance window, and the number s of recurrences considered to establish the correlation are often programmable to be constantly adapted to the density of the traffic and hence of the responses.

Because of the principle of correlation adopted, right responses are eliminated, i.e. responses that are liable to participate successfully in a successful correlation.

This elimination arises out of the fact that each response that arrives is kept for a number s of recurrences and that the operation will count on the following $s-1$ recurrences if there are at least $r-1$ synchronous responses.

The $s-1$ recurrences preceding the current response are therefore routinely lost.

The invention seeks to improve the probability of detection of the responses. According to the invention, a search is made, among all the sequences of s consecutive recurrences containing the current recurrence, to see if there are $(r-1)$ other synchronous responses. Hence, not only the preceding $s-1$ recurrences but also the following $s-1$ recurrences are taken into account.

It is stressed that what is done here is not merely to set up a correlation with the responses of the $s-1$ preceding recurrences and with the responses of the $s-1$ following recurrences, i.e. a total of two correlations instead of the single correlation of the known methods.

Figure 1B:
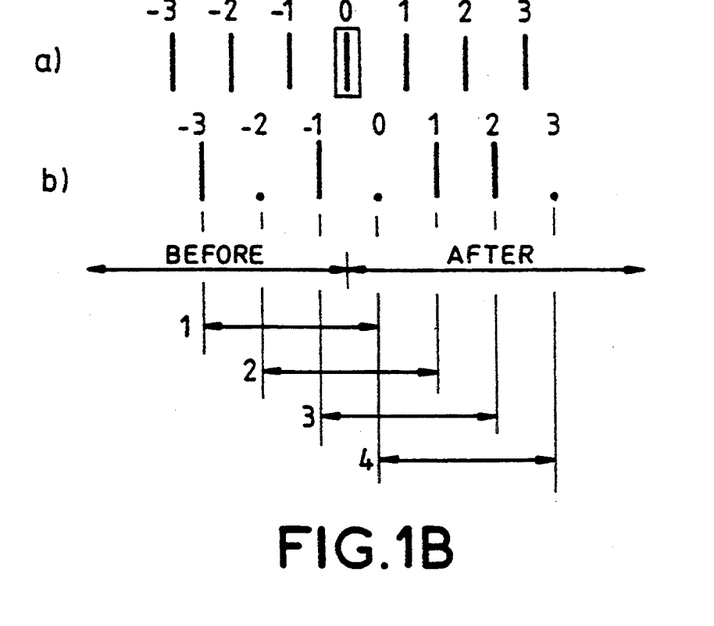

What is done is to verify that there is at least one correlation with the responses of the s recurrences preceding or following the current recurrence and containing it. This point is illustrated in FIG. 1b for an r/4 criterion. The row a of this figure shows a sequence of seven interrogations comprising a so-called current interrogation numbered 0, three preceding interrogations numbered −1 to −3 and three following interrogations numbered 1 to 3. The responses shown in rows b bear corresponding numbers. They are represented by a line when a response has been detected and by a dot when there has been no response. According to the invention, four correlations will be made with the four consecutive recurrences containing the current recurrence. These sequences of recurrences are represented by arrows numbered 1 to 4 in the FIG. 1b.

The first sequence is formed by recurrences −3 to 0, the second by recurrences −2 to 1, the third by recurrences −1 to 2 and finally the last one by the recurrences 0 to 3.

In the example shown in FIG. 1b, if a 2/4 (r=2) criterion is taken, the current response correlates in each of the four sequences. On the contrary, with a 3/4 criterion, only the third sequence gives a positive correlation result. A simple correlation done with the previous recurrences only or the following recurrences only, i.e. the sequences 1 and 4 in the example, would have led to rejecting the current response. The processing according to the invention therefore really contributes to increasing the probability of detection. Returning to the example, of FIG. 1a we have shown the responses that are correlating and are therefore transmitted in the case of a 2/2 criterion of correlation on the row h and in the case of a 3/3 criterion of correlation on the row i, when the responses are those indicated in the row d. To say that there has been correlation, and to set up the row h, not only the following recurrence but also the preceding recurrence has been considered for each response of the row d. Similarly, for the row i, not only the two following recurrences but also the two preceding recurrences have been considered for each response pulse of the row d. For these two rows (h and i), the results have been shown with only two correlations, wherein the sequences used for correlation contain the current reccurence in the first position and the last position respectively. The rows h and d are similar. This means that, with this new criterion, there has been, in this case, no deterioration of the information. This is not always the case. Thus, in the row i, there are 11 responses transmitted instead of 6 in the row g, for the same 3/3 criterion of correlation. This improvement of the result is possible because the responses considered as being synchronous are not only those giving a successful correlation with the following two recurrences but also those giving a successful correlation with the preceding two recurrences.

Through the invention, it is furthermore possible to obtain an improvement, for a same criterion of correlation, in the number of responses transmitted and hence to eliminate the fruits without any deterioration of the probability of detecting the synchronous responses.

It has indeed been seen that the principle of correlation based on the analysis of the future (or the past) of the response to be correlated is defective for the last (or first) responses of a transponder which, although synchronous, are considered to be fruits for they no longer have (or do not yet have) a sufficient number of other correlating responses. They are therefore eliminated, with a corresponding reduction in the probability of detection and even the precision of the radar (the mean value of the noise is computed for fewer responses).

The responses held back, as synchronous responses, by the defruiter according to the invention, are each of the synchronous responses that have participated in a successful correlation. The correlation is done for each of the s sequences of s recurrences containing the current response. The row j of FIG. 1a shows, for a defruiter working according to this principle, the synchronous responses transmitted after defruiting, the responses received being always those shown in row d. For each response from this row, three correlations have been made as explained with reference to FIG. 1b. The responses represented in the row j are those that have taken part in at least one successful correlation according to the 3/3 criterion. With reference to the row i, which is the best one for this correlation, there is an additional response which is the response No. 13. This response is not shown in the row i, for the upline responses 11 and downline responses 15 are missing. By contrast, the response 13 participates with a successful correlation with the upline response 12 and the downline response 14. It is therefore included in the row j.

It is known that the secondary radars can send their interrogations according to several modes of interrogation. The responses from the transponder are normally sent in the same mode. In the method according to the invention, it is possible to make correlations on recurrences without considering their mode. These will be intermode correlations. It is also possible to choose only the recurrences where the interrogation has the same mode. These will be monomode recurrences.

In a preferred embodiment, the correlations will be done both on groups of intermode sequences and on groups of monomode sequences, the correlation being declared to be positive if it has been successful on only one of the sequences.

SUMMARY OF THE INVENTION

In short, the invention relates to a method for the defruiting of the responses from radar transponders, received by a secondary radar, to interrogations sent by the radar recurrently according to a mode of interrogation, where it is necessary, by convention, for the interrogation and the corresponding response to be in the same mode, a recurrence being formed by the interrogation and the responses received during a listening period that follows the interrogation, wherein the defruiting consists in ascertaining that a response received at an instant T of the recurrence is correlated by the presence of at least $r-1$ other responses received at the same instant T of their recurrence, these responses forming part of a sequence of at least r recurrences including the current recurrence, the method being one wherein the correlation is made on several chosen sequences and wherein the correlation is declared to be positive if it is positive for one of the sequences.

The correlation itself is made in a known way by shift registers comprising compartments, each compartment being connected appropriately to summators to make the correlation according to the chosen criterion or criteria of correlation. The problem as regards obtaining the correlation with the previous responses according to the method indicated further above is that when the current response arrives at output of the shift register, the previous responses have come out therefrom, and all that are available are the following responses which are in the previous compartments of the shift registers.

Similarly it is not known whether or not the current response has already participated in a previously successful correlation. This is why, in the device according to the invention, there is provision for the association, in a device called A, of a standard response memory and of a flag memory. The standard memory is a memory ordered in terms of distance. It is constituted by X multiplied by a memory compartments where "a" is the length of the memory and X is its depth, "a" represents the number of range gates of the secondary radar receiver, "X" represents the number of recurrences taken into account to load the memory. Each detection of a response in the range gate $a_i$ ($0 \leq a_i \leq a$) for the recurrence $j$ ($0 \leq j \leq X-1$) gives rise to a recording in the address memory i, j. This recording is done in real time by the fact that, in a standard way, the addressing of the memory compartments is incremented from i to i+1 at the rate of the beats of a clock and from j to j+1 at each changing of recurrence. The flag memory is a memory identical to the memory of the responses. It is also ordered in terms of distance and is synchronous with the memory of the responses. When a response of the memory of the responses has taken part in a correlation that is successful according to the chosen criterion, it is marked in the flag memory. Thus, when it is being treated, at the recurrence Z, it will be considered to be synchronous, whether or not it correlates at this period of time, with the preceding or following responses alone.

Thus, the invention relates to a defruiter for an extractor of secondary radar transponder responses located downline with respect to a receiver of signals, the receiver having successive periods of reception called recurrences and being provided with means enabling the conversion of the magnitudes characterizing the received signals into series of digital samples at a sampling rate f, the extractor comprising a detector of responses, hereinafter referenced BPD (bit pair detection), sent out by the transponders, the defruiter comprising means for the storage of detection information elements, ordered in terms of distance and by recurrence, a correlator receiving the detection information elements in sequence from the detection information storage means, and ascertaining, for each of the detections $BPD_S$ of an S rank recurrence, by means of a correlation called a current correlation, that this detection is correlated by the presence of at least (r−1) other detections, at the same distance as the current response, the correlator receiving, to this end, at the same time as the response being processed $BPD_S$, the responses located at the same distance, from at least (r−1) recurrences chosen from among (s−1) recurrences that have preceded the current recurrence, the defruiter being one wherein the storage means is a memory comprising memory compartments ordered in s rows numbered from 0 to (s−1) and a columns, a representing a number of range gates, an address of the memory being constituted by a column number i and a row number j, and wherein the defruiter further comprises a memory called a flag memory identical to the storage memory and receiving, from the correlator, at the address that they had in the storage memory, the detection information elements relating to all the responses that have participated with the current response in a successful correlation, the correlator receiving, at the same time as the responses from the storage memory, the information element on positive prior correlation, if any, that is in the flag memory at the same address as the current response in its memory, the correlator comprising means so that the correlation is declared to be positive either if a positive marker is present in the flag memory or in the event of a successful current correlation.

The flag memory thus contains all the responses that have participated in a prior successful correlation. The correlation is done at the instant when what has been called the Sth response is introduced into the range gate that corresponds to its instant of reception. The correlation is therefore done once with the s−1 previous responses recorded at the same distance. If the correlation is positive, the responses of the s−1 previous recurrences will get recorded in the flag memory. If it is assumed, for example that, at the second recurrence, there is a response, then this response will be recorded in its place in the flag memory. If it is now assumed that, at the following recurrence, the former second response which has now become the first response does not give a positive current correlation with the responses of the s−1 following responses, then this response would be rejected with the known defruiters. With a defruiter according to the invention, this response will not be rejected for it will also be at the output of the flag memory.

BRIEF DESCRIPTION OF THE DRAWINGS

The invention shall now be described with reference to the appended drawings, of which.

MORE DETAILED DESCRIPTION

Figure 2:
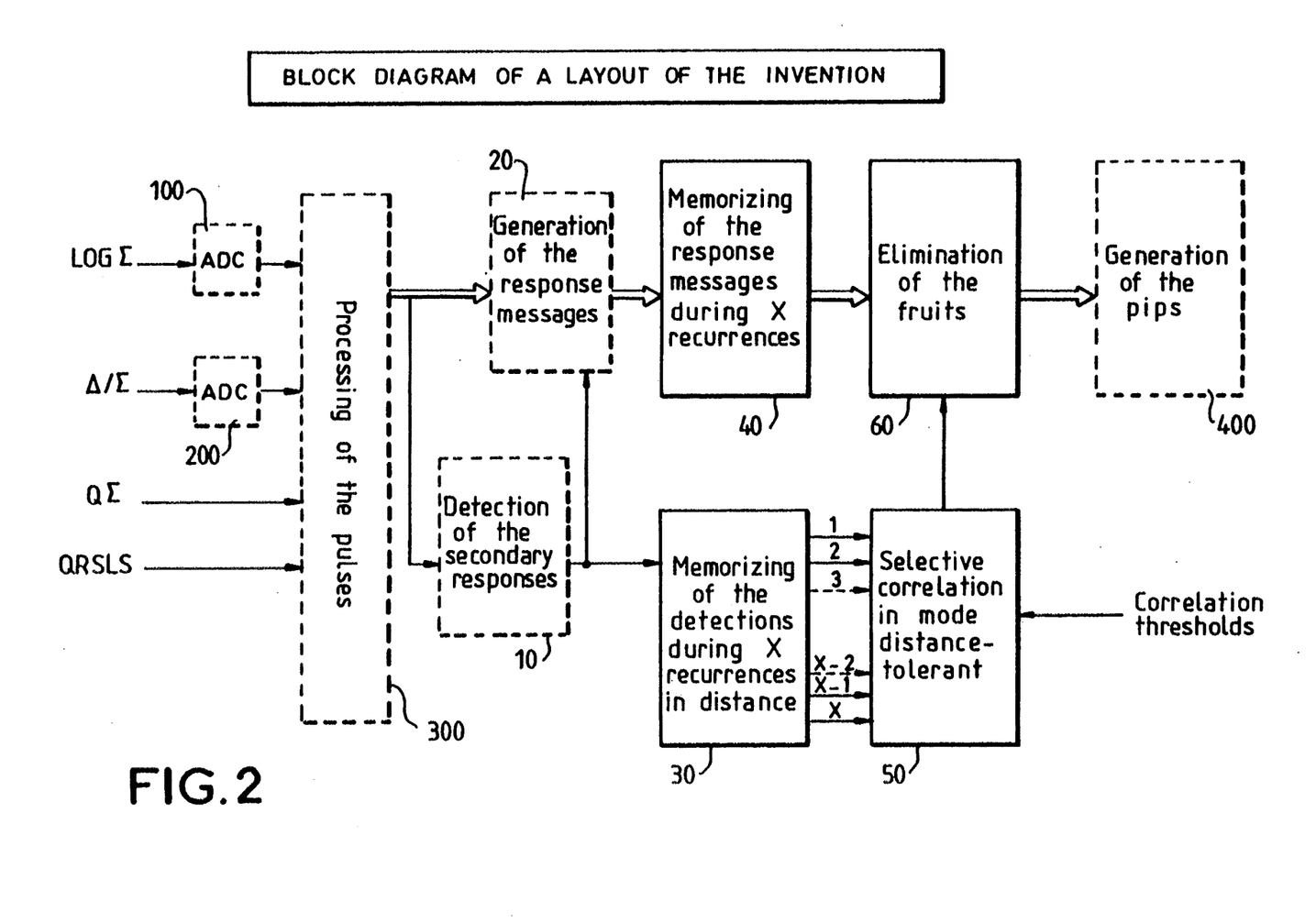
FIG. 2 shows the layout of the device within a secondary receiver.

FIG. 2 shows the layout of the device of the invention in a secondary radar receiver. The device of invention is located downline with respect to a circuit 300 which does not form part of the invention. This circuit receives signals created in a manner known per se. One of these signals represents an information element that is conventionally called Log sigma. This signal represents the power of the signal received after it has been amplified in a known way by a logarithmic amplifier. This signal Log sigma is converted into a digital signal by an analog-digital converter 100 before being introduced into the device 300. Another signal, conventionally called Delta sigma, representing the angular difference between the radioelectrical axis of the radar antenna on the surface and the position of the aircraft in the lobe of the antenna, is converted into a digital value by an analog-digital converter 200 before being introduced into the circuit 300.

Figure 5A:
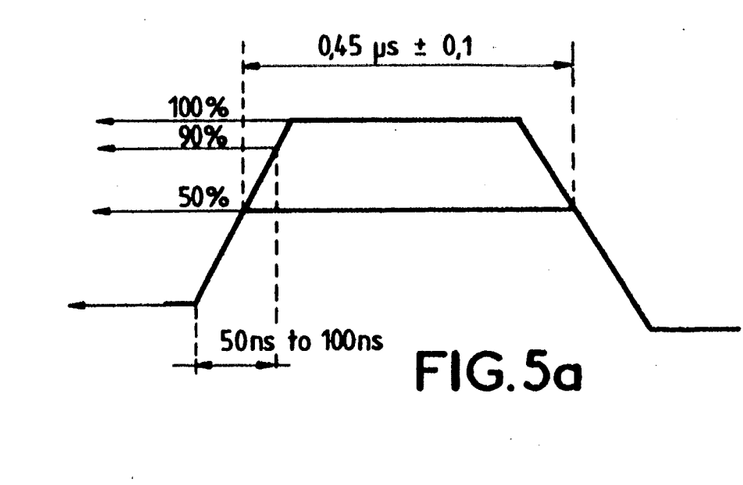
FIGS. 5a–5b illustrates the nature of a secondary response message.

The circuit 300 also receives a signal that is conventionally called a Q sigma signal which is a copy of the Log sigma signal reduced by six decibels so as to obtain the midpoint of the value of the power of the pulse. The device 300 also receives a signal QRSLS, called a reception signal on minor lobes. Since the device 300 does not form part of the present invention, only the functions needed to understand the invention shall be described here below. With regard to the working of the invention, the device 300 prepares the position of the leading edges of the pulses. This preparation is done firstly by taking account of the detection of the real leading edges and secondly by generating artificial leading edges or pseudo leading edges when a real pulse has a duration greater than the normal duration of a pulse. This generation may be done either on the basis of the trailing edge of the real pulse or, if a change in the level of power is detected, on the basis of the moments of this change in power. These pseudo leading edges are created on the basis of the available knowledge of the normal duration of a pulse sent by a secondary radar transponder. The international standardization of this type of response is given here below to make it easier to understand the invention with reference to FIG. 5.

Figure 5B:
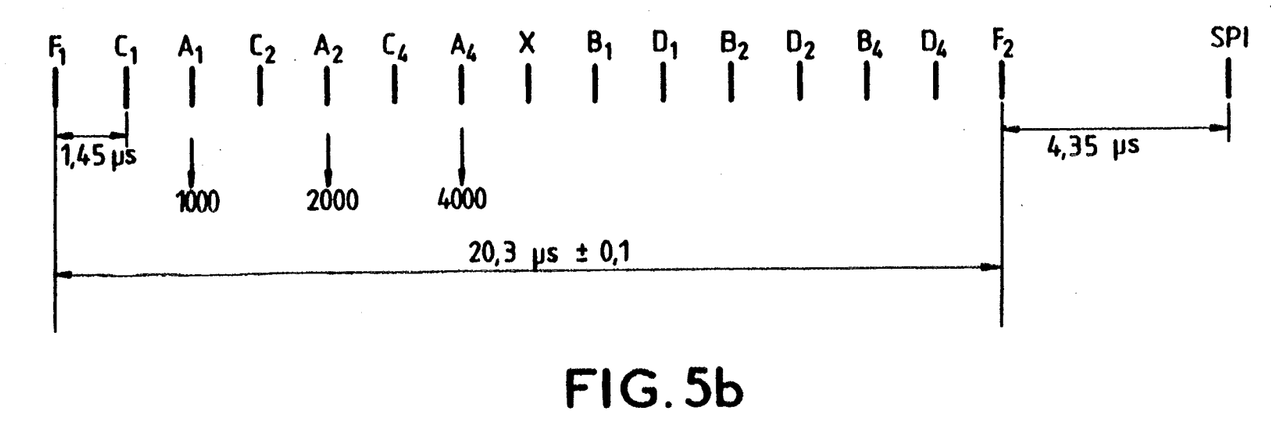

A pulse is formed by a pulse train. Each pulse shown in FIG. 5a has a leading edge such that, in 50 nanoseconds or 100 nanoseconds, a power level representing 90% of the maximum level is reached. This pulse comprises a plateau corresponding to the power level and a decreasing edge. The time difference between the points of the leading edge and the trailing edge having a power level equal to 50% of the maximum power of the pulse is 0.45 $\mu$s +0.1 $\mu$s. The pulse train shown in FIG. 5b is framed by a first pulse called $F_1$ and a last pulse called $F_2$. These framing pulses are always present. At time intervals that are multiples of 1.45 $\mu$s, behind $F_1$, twelve pulses are present or not present. The presence or absence of these pulses enables the transmission of an identity or an altitude. The conventional names of the different pulses are shown in FIG. 5b. In certain cases, the pulse train has an additional pulse called SPI located at a distance of 4.35 $\mu$s behind $F_2$.

The presence or absence of a secondary radar response is detected by the presence or absence of the pair of framing pulses $F_1$ and $F_2$.

The detection, therefore, of the responses of the pair of pulses $F_1$, $F_2$ done by a module 10 is not part of the present invention.

The device according to the present invention is therefore located downline with respect to the circuit 10 for the detection of the pairs of pulses and a device 20 which uses the information elements of the device 300 to create the messages contained in each of the received responses.

The devices 100, 200, 300, 10, 20 and a device 400 for the generation of the pips after defruiting, which are useful for an understanding of the invention but are not a part of it, are shown in FIG. 2 in dashes.

Before these responses are sent to the processing and/or display devices, it must be ensured that the detected responses are not ghost responses and hence that they are mutually correlated according to criteria of synchronism described further above, with a probability that is a function of the chosen criterion of synchronism.

In the preferred embodiment of the present invention, two criteria of correlation, both of which are applied simultaneously, have been chosen, one response being declared to be right and transmitted if it verifies at least one of the two criteria. Each of these two criteria can however be applied separately.

The first criterion is that at least N responses among M recurrences correlate with one another.

The second criterion is that at least P responses among Q recurrences, all having the same mode of interrogation, correlate with each other.

The different modes of interrogation and corresponding response are defined by an ICAO standard. They are called 1, 2, 3/A, B, C, D. The modes 1, 2, 3 are the interrogation modes for military aircraft, the modes A, B, C, D are the interrogation modes for civilian aircraft. The modes 3 and A are identical so that they pertain to both civilian and military aircraft.

In the preferred embodiment of the invention, the following have been chosen: M=8 and Q=4. The numbers N and P are programmable. The way in which the modes of interrogation may be interleaved in repetitive sequences is given in FIG. 6. This figure comprises the rows a to f.

Figure 6:
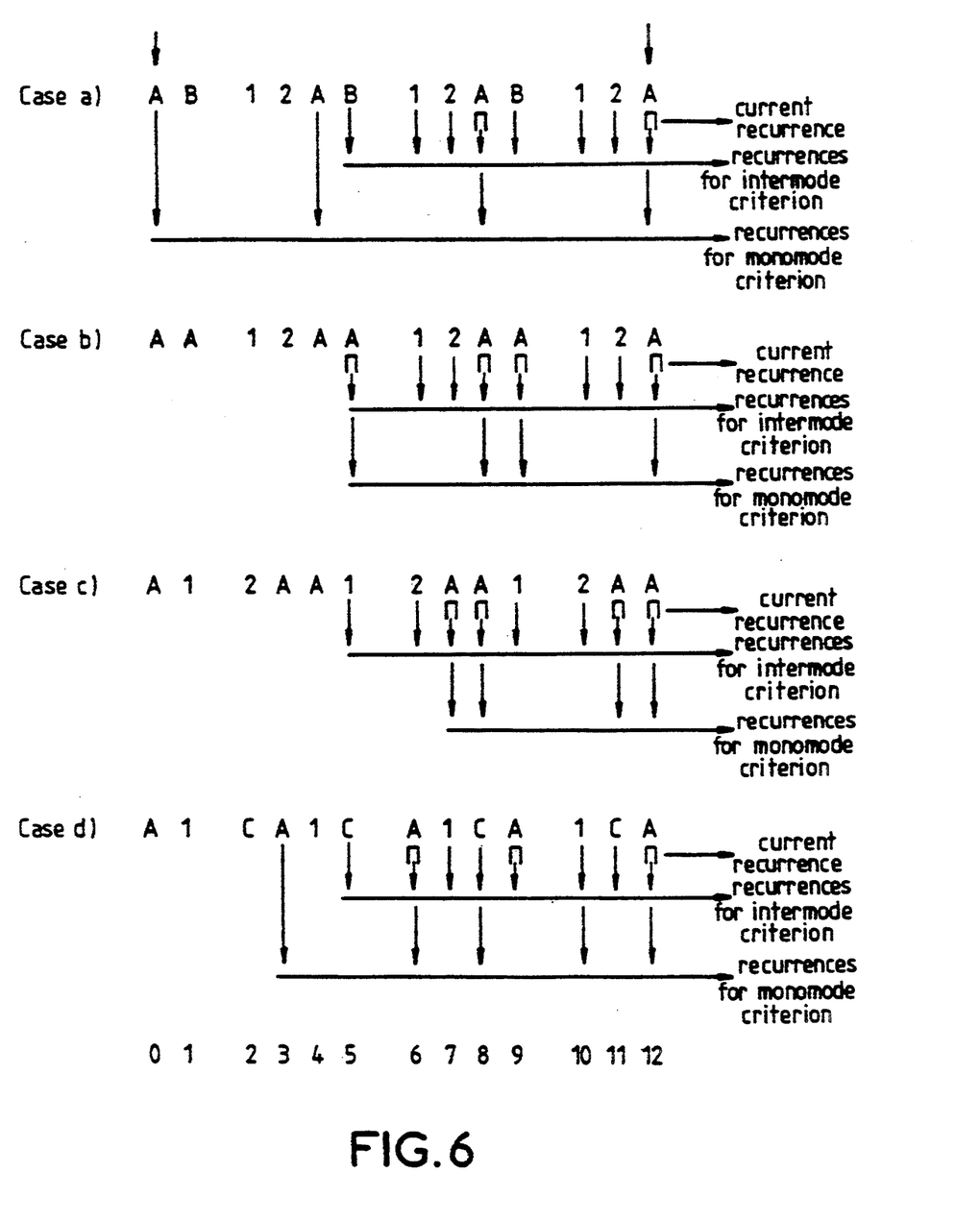
FIG. 6 represents the sequences of interleaving of the modes of interrogation of a secondary radar.

In these figures, it is seen that to make it possible to obtain eight responses to eight interrogations, whatever may be the mode, it is obviously necessary for these eight interrogations to have been sent out. By contrast, to make it possible to have four responses to a single given mode of interrogation, there must be a variable number of interrogations which is thirteen in the case of the sequence shown in row a and four in the case of the sequence shown in the row f. This is fairly general: to have at least four interrogations in a given mode, it is necessary to have at least four interrogations and at most thirteen interrogations in the case of a four-mode interleaving. This observation explains why the recording of the detections, in the embodiment described herein, is done on thirteen recurrences as shall be seen further below.

The optimum number of recurrences taken into account to make the correlation is the maximum number of interrogations that can be received by an aircraft in the course of one antenna dwelling. This number is proportional to the frequency of recurrence of the interrogator and to the angle of aperture of the antenna and is inversely proportional to the speed of rotation of the antenna.

Until now, the description has been limited to elements or pieces of information necessary for an understanding of the device according to the invention. This device shall now be described.

The device according to the invention is a defruiter formed by the devices 30, 50 and 40, 60 (FIG. 2).

Of the device 30 shown in FIG. 3, half is matrix memory 35, each column of which represents a range gate. The difference in distance between two consecutive range gate columns corresponds to 50 light nanoseconds. For a range of 265 nautical miles, there are 65536 columns.

The second half 36 of the device 30 is a flag memory identical to the first one.

Each of these memories has thirteen rows. The first of these memories 35 therefore makes it possible to memorize all the recorded detections coming from the device 10. With the address of the memory, given by its column number i and its row number j, being known, an information element on a bit in this memory makes it possible to know that a detection called BPD has been done at the $j^{th}$ recurrence coming from a carrier located at i range gates from the interrogator. The second of these memories, the flag memory, is used to indicate that a detection of the first memory has been successfully used in a correlator, which shall be described further below, to achieve a prior current correlation with other detections.

The mode of use of these memories shall now be described with reference to FIG. 3.

Figure 3A:
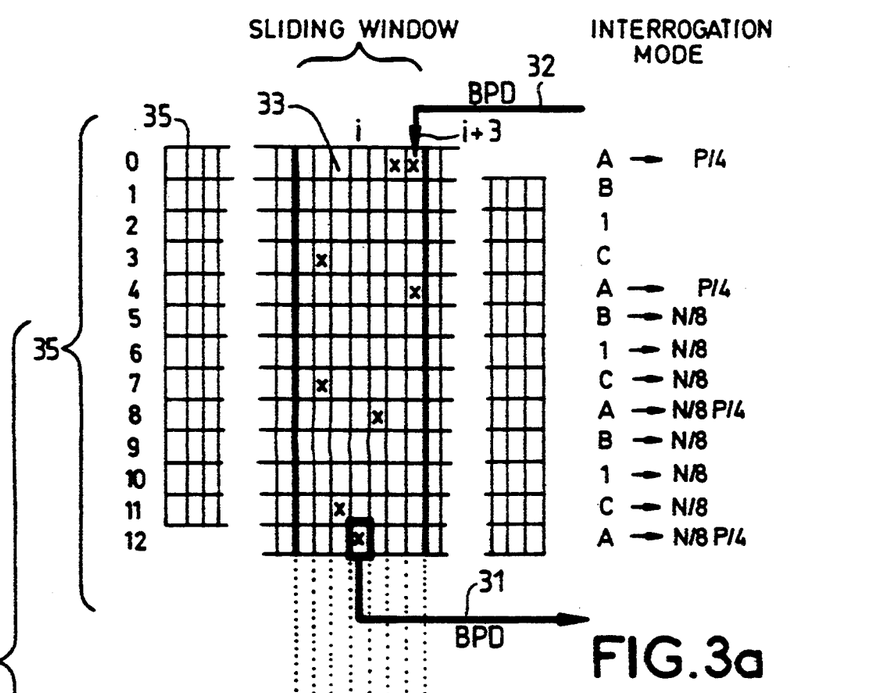
FIGS. 3a–3b shows a first and a second matrix memory.
Figure 3B:
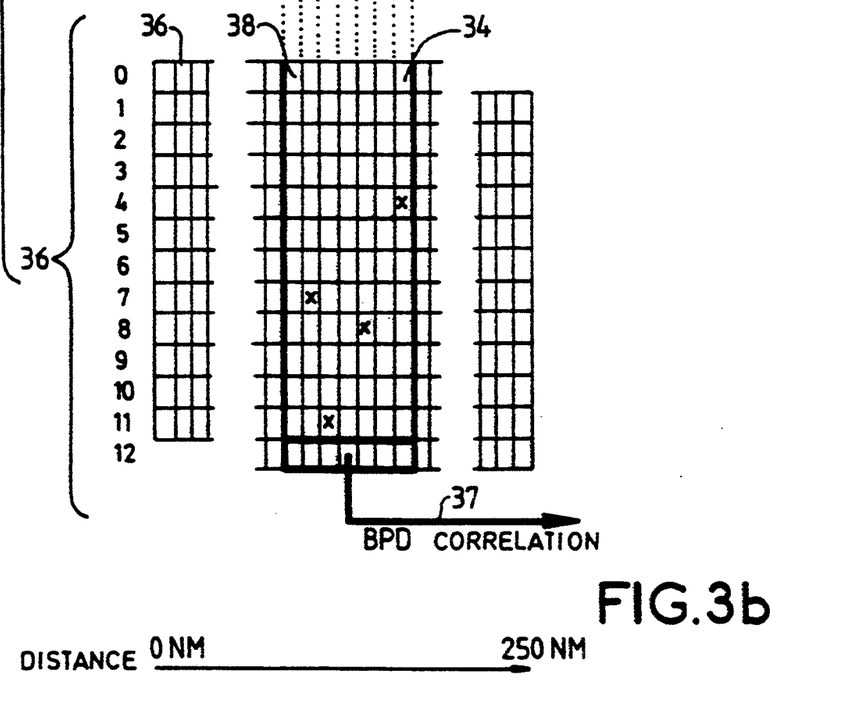

FIGS. 3a and 3b respectively show a part of the columns of the first memory (35) and second memory (36). Each of the columns comprises thirteen rows of compartments numbered 0 to 12.

Facing each of the rows of the memory of FIG. 3a and on the right side, the mode of interrogation of the recurrence recorded on the row has been shown as an example. The interleaving of the modes of interrogation of the example shown in FIG. 3 is such that thirteen recurrences are needed to make it possible to obtain four responses to a same mode of interrogation.

Two heavy dark lines frame seven memory columns.

These seven columns have a central address column i, three previous address columns i−1 to i−3 and three following address columns i+1 to i+3.

These seven columns constitute a sliding window 33 which moves forward by one column at each incrementation by i. The column i represents the current column being examined. The range gates with addresses i−3 to i+3 are, taking account of the tolerances, considered to be equivalent for the current processing at the range gate i. This method amounts to considering responses that arrive in time intervals T−τ, T−τ to be synchronous, τ designating a tolerance time which, in this example, is equal to 150 nanoseconds. The tolerances in terms of distance are essentially due to the tolerances with regard to the response time of the transponders and to the uncertainty introduced by the digital sampling at the converters.

In FIG. 3a, two arrows mark the sequential operation of the memory. The upper arrow 32 indicates that the loading of the memory with the signals BPD from the detector 10 is done at the row 0 in column i+3, while the examination of the responses for correlation is done in column i, row 12. A correlation processing operation is triggered by the presence of a 1 in the current column i at the row 12. The correlation is declared to be positive and the response is transmitted if one of the following two conditions is fulfilled:

1) there is an information element on positive prior correlation at output of the information compartments i−3 to i+3 of the row 12 of the flag memory 36, or 2) the current correlation done in the device 50 is positive.

The result of the correlation thus made supplies a standard device 60 for the elimination of the fruits 60 (FIG. 2). In a manner known per se, this device receives the response messages coming from a time-lag memory 40. This memory has the function of preserving the images received during the time needed to carry out the correlations giving, in the case of the embodiment, thirteen recurrences.

The device 60 carries out, inter alia:

the synchronization between the detections, which are delayed by the time needed to make the correlations, and the data elements associated with these detections stored in the memory 40;

the checking of the processing of all the responses of a preceding recurrence before the passage to the next recurrence;

the correspondence between the processed BPDs and the data elements of the message associated with the pair $F_1$, $F_2$ corresponding to this BPD;

finally, it carries out the filtering by not transmitting, to a pip-generating device 400, the message of a response considered to be asynchronous because it has never been correlated.

The working of the device 50 shall now be explained with reference to FIGS. 4a and 4b, especially as regards the mode of loading of the flag memory.

Figure 4A:
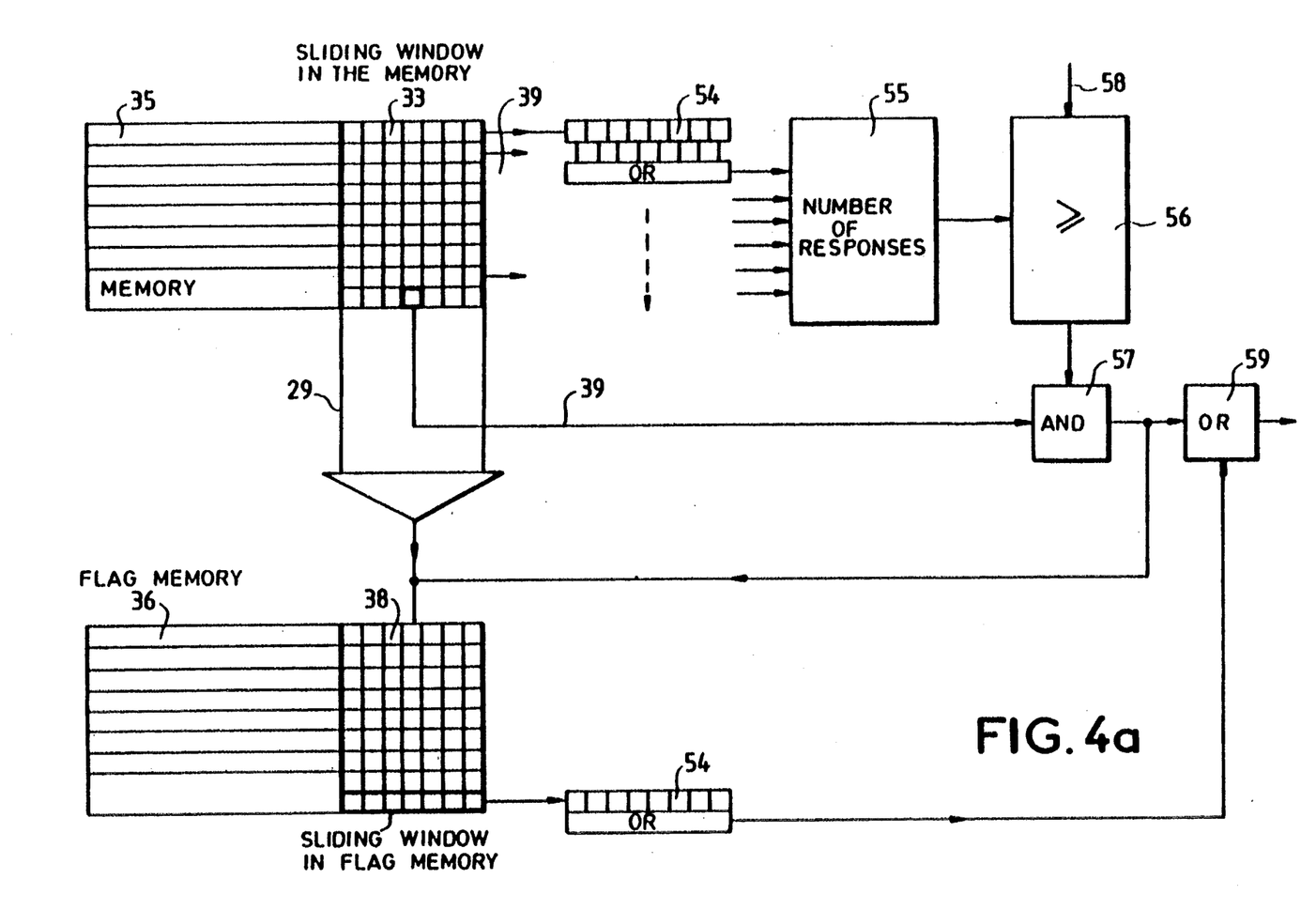
FIGS. 4a–4b designed to illustrate the working and the sequencing of the defruiter.

FIG. 4a shows a correlation device working with a single predetermined choice of the rows following the current row for the performance of the correlation, for example intermode correlation, on consecutive recurrences following the current recurrence. The detection and flag memories are represented by the rectangles 35 and 36 and the sliding windows having a central address i of each of the memories represented by the rectangles 33, 38. Only the data elements shown in these windows are used for the correlation.

Data elements of the window 33 are extracted by a parallel bus 39 having one channel per memory row. These data elements are sent to a device 55 designed to count the number of responses. An intermediate set of "OR" gates 54, only one of which is shown, enables the counting, for only one response, of the responses that occur on one and the same row. The output of the device 55 supplies a comparator 56, the comparison term of which is introduced by a command 58.

The output of the comparator 56 supplies a set of "AND" gates 57 which also receives the signal BPD being examined through a channel of the bus 39. If the intermode criterion is selected and if the output of the device 56 is positive, then the device 57 permits the loading of the data elements of the rows of the window 33 having participated in the correlation at the corresponding address of the window 38 of the memory 36.

An "OR" gate 59, having two inputs and one output, receives the output of the "AND" gates 57 and the information on the presence of an information element on positive prior correlation at the columns i−3 to i+3 of the last row of the flag memory. This gate gives the result of the correlation at its output.

Figure 4B:
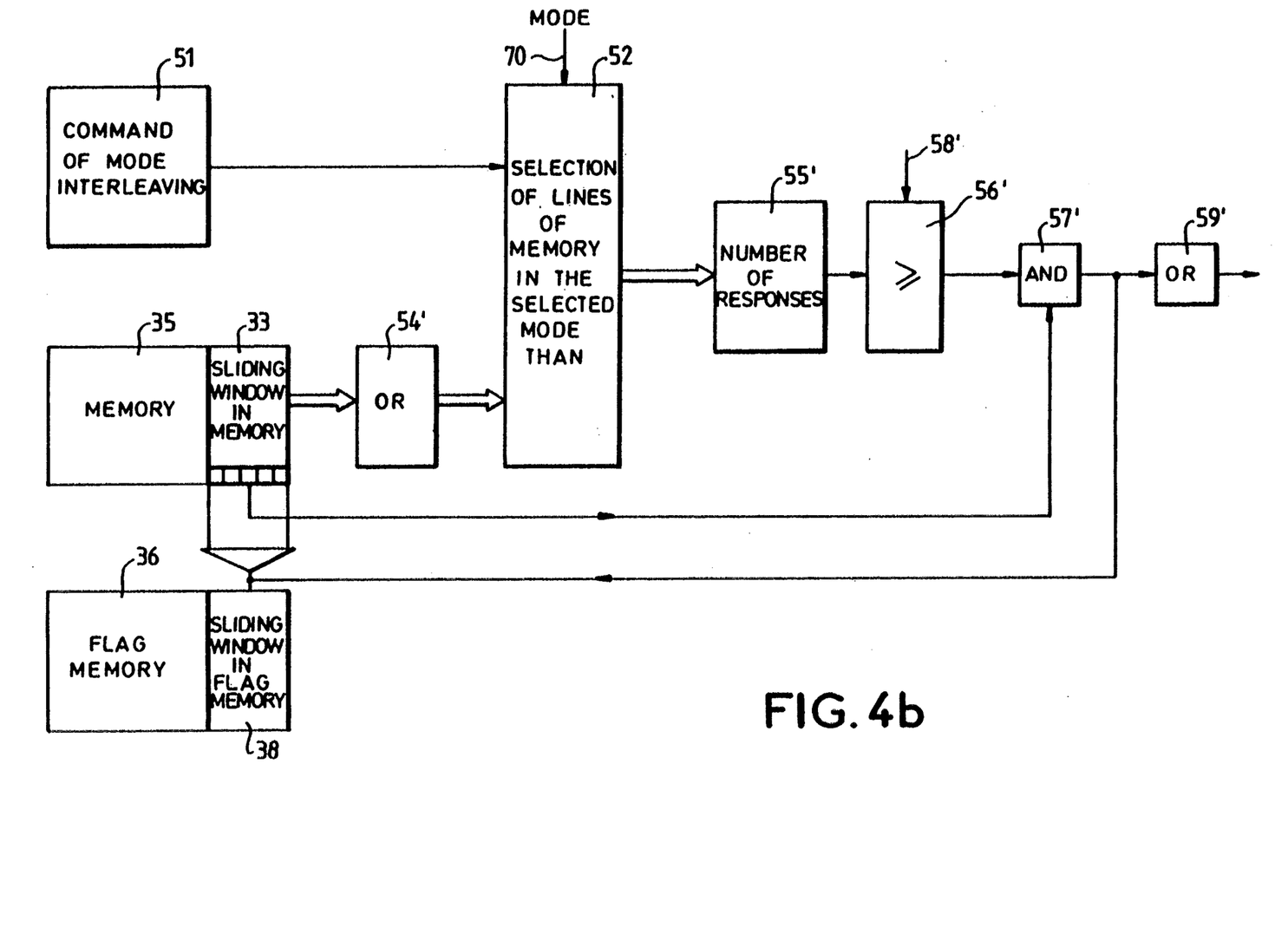

FIG. 4b shows a correlation device with a possibility of the choice of the rows participating in the correlation, for example to achieve intermode or monomode correlations on successive recurrences following the current recurrence. In this figure, the elements having the same function as those of FIG. 4a bear the same number with the sign (') to distinguish them.

For this mode of correlation, devices 51 and 52 have been added. The device 51 generates the data elements pertaining to the interleaving of the interrogation modes, and the device 52 makes it possible, with these data elements and a mode command 70, to select the lines of the window 33 that are in the same mode and that follow the current recurrence, or the recurrences following the current recurrence independently of their mode. What the device 55' receives thereafter, by means of the device 52, are only the data elements pertaining to these rows.

The operation is as follows in the case of the preferred mode: the data elements introduced into the devices 55 or 55' are those of the (N−1) consecutive recurrences following the current recurrence or that of the X−1 recurrences following the current reference, i.e. in the case of the embodiment, 7 for the device 55 or 12' for the device 55. The comparison thresholds introduced by the commands 58, 58' are the numbers P−1 and Q−1 respectively. A positive result is obtained at output of the device 56, 56' if the number of responses counted is greater than the threshold introduced by the commands 58, 58' respectively.

The sequencing of all the operations inside the different means of the, embodiment incorporating the device according to the invention is done at the rate of a clock that controls both the digital sampling and the different processing sequences. As a result, the processing is brought forward by one operation each time that a new sample is taken.

Returning to the example of figure 1b, an explanation shall be given of why the device according to the invention truly achieves, for each response such as the response 0, the correlations by means of the sequences i to 4 shown in this figure.

The correlation on the sequence i is done if a BPD is present at the recurrence −3. This is also the case for the correlations on the sequences 2, 3, 4 which are done if there is a presence of BPD at the recurrences −2, −1 and 0 respectively. If there is no BPD at one of these positions, the correlation on the corresponding sequence is not done. Thus, in the example of figure 1b, the correlations on the sequences 2 and 4 are not done with the device according to the invention. It should however be noted that, when there is no BPD the position −2, the sequence 2 contains at most as many responses as the sequence 1. The sequence 2 is therefore redundant and eliminating it causes no problems.

Figure 1C:
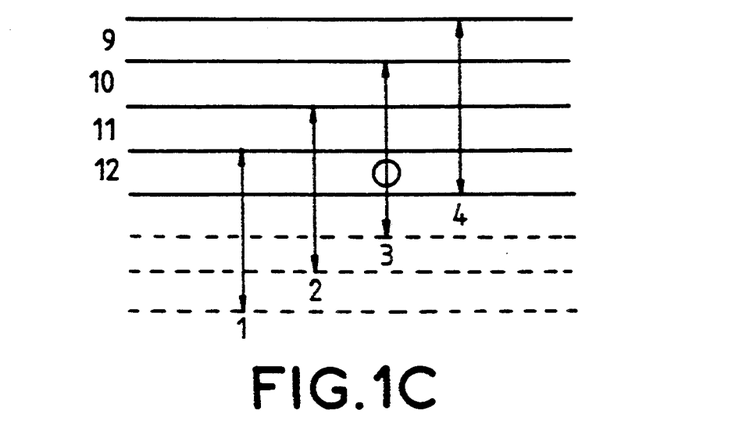

In figure 1c, the sequences 1 to 4 have been shown in correspondence with the memory rows that they use. Four memory rows 9 to 12 represent the last rows of the memory 35. The sequence 4 is done with the current recurrence located on the row 12, called 0 in figure b, and with the three recurrences that follow, namely the rows 9 to 11. The previous sequences have been done in their turn, but the corresponding row information elements shown in dashes are no longer in the storage memory. However, if the performance of the sequence 3 for example has given a successful correlation in which a response located in the row 12, as shown in figure 1c by a circle,, has participated, then this response, which was in the row 11 when the correlation on the sequence 3 had been performed, has been recorded in the form of a successful correlation information element in the flag memory at its place in the row 11. When the sequence 4 is carried out, this information element on successful correlation which is then at the row 12 of the flag memory shall be considered to be correlating even if the sequence 4 does not lead to a positive correlation.

Thus, it can be said that the flag memory is the memory of the S−1 correlations performed on the sequences containing the current response and carried out earlier. The current correlation is the sth and last correlation done before this response. This is why, in FIG. 4, it is the output signal of the "OR" gate 59 which represents the correlation result. The gate receives firstly the result of the current correlation and, secondly, the indication of presence of the response in the flag memory at the sth row. This presence reflects the result of correlation, for this response, of the s−1 previous correlations in which it has participated.

What is claimed is:

1. A method for the defruiting of the responses from radar transponders, received by a secondary radar, to interrogations sent by the radar recurrently according to a mode of interrogation, where it is necessary, by convention, for the interrogation and the corresponding response to be in the same mode, a recurrence being formed by the interrogation and the responses received during a listening period that follows the interrogation, wherein the defruiting consists in ascertaining that a response received at an instant T of the recurrence is correlated by the presence of at least r−1 other responses received at the same instant T of their recurrence, these responses forming part of a sequence of at least r recurrences including the current recurrence, the method being one wherein the correlation is made on several chosen sequences and wherein the correlation is declared to be positive if it is positive for one of the sequences.

2. A method according to claim 1, wherein the chosen sequences are sequences formed by a same number of consecutive recurrences, the number of sequences being equal to the number of recurrences.

3. A method according to claim 1, wherein the chosen sequences are sequences formed by a same number of consecutive recurrences in the same mode as the current response, all the sequences being formed by a same number of recurrences and the number of sequences being equal to the number of recurrences.

4. A method according to claim 1, wherein the sequences are a same number of consecutive recurrences in any mode, the number of each occurrences being equal to the number of such recurrences and a same number of consecutive recurrences in the same mode, and the number of such sequences being equal to the number of recurrences in said mode.

5. A method according to the claim 1, wherein the responses are considered to be synchronous if they are received in the time intervals T−$\tau$, T+$\tau$, $\tau$ designating a tolerance time.

6. A defruiter for an extractor of secondary radar transponder responses located downline with respect to a receiver of signals, the receiver having successive periods of reception called recurrences and being provided with means enabling the conversion of the magnitudes characterizing the received signals into sequences of digital samples at a sampling rate f, the extractor comprising a detector of responses referenced BPD sent out by the transponders, the defruiter comprising means for the storage of the detection information elements, ordered in terms of distance and by recurrence, a correlator receiving the detection information elements in sequence from the detection information storage means, and ascertaining, for each of the detections $BPD_S$ of a recurrence having a rank S, by means of a correlation called a current correlation, that this detection is correlated by the presence of at least (r−1) other detections, at the same distance as the current response, the correlator receiving, to this end, at the same time as the response being processed $BPD_S$, the responses located at the same distance, from at least (r−1) recurrences chosen from among (s−1) recurrences that have preceded the current recurrence, the defruiter being one wherein the storage means is a memory comprising memory compartments ordered in s rows numbered from 0 to (s−1) and a columns, a representing a number of range gates, an address of the memory being constituted by a column number i and a row number j, and wherein the defruiter further comprises a memory called a flag memory identical to the storage memory and receiving, from the correlator, at the address that they had in the storage memory, the detection information elements relating to all the responses that have participated with the current response in a successful correlation, the correlator receiving, at the same time as the responses from the storage memory, the response, if any, that is in the flag memory at the same address as the current response in its memory, the correlator comprising means so that the correlation is declared to be positive either if a signal BPD is in the flag memory or in the event of a successful current correlation.

7. A defruiter according to claim 6, wherein the correlator comprises a device receiving information elements that characterize modes of the different recurrences and a selection device receiving, from said device receiving information elements, information elements on mode selection and selecting, from the storage memory, the rows that participate in a correlation with the current response.

8. A defruiter according to claim 6, wherein the sequencing of the operations for loading the memories and for correlation is done at the same frequency f as the sampling operations.

* * * * *